(12) United States Patent
Jinnouchi

(10) Patent No.: US 6,928,309 B2
(45) Date of Patent: Aug. 9, 2005

(54) PORTABLE COMMUNICATION TERMINAL CHARGER SYSTEM

(75) Inventor: Kohki Jinnouchi, Higashihiroshima (JP)

(73) Assignee: Sharp Kabushiki Kaisha, Osaka (JP)

( * ) Notice: Subject to any disclaimer, the term of this patent is extended or adjusted under 35 U.S.C. 154(b) by 501 days.

(21) Appl. No.: 10/097,833

(22) Filed: Mar. 15, 2002

(65) Prior Publication Data

US 2002/0132651 A1 Sep. 19, 2002

(30) Foreign Application Priority Data

Mar. 16, 2001 (JP) .......................................... 2001-076097

(51) Int. Cl.[7] .............................. H04M 1/00; H04B 1/06
(52) U.S. Cl. ........................ 455/572; 455/573; 455/344; 455/346; 455/352
(58) Field of Search ................................ 455/569, 572, 455/573, 41.1, 41.2, 41.3, 344, 345, 346, 347, 352, 353, 90.1, 90.2, 90.3, 575.6

(56) References Cited

U.S. PATENT DOCUMENTS

| | | | | |
|---|---|---|---|---|
| 5,130,634 A | * | 7/1992 | Kasai | 320/160 |
| 5,511,240 A | * | 4/1996 | Nishiyama | 455/127.1 |
| 5,754,625 A | * | 5/1998 | Shimura | 455/554.1 |
| 5,965,998 A | * | 10/1999 | Whiting et al. | 320/165 |
| 6,035,350 A | * | 3/2000 | Swamy et al. | 710/73 |
| 6,073,031 A | * | 6/2000 | Helstab et al. | 455/557 |
| 6,150,796 A | * | 11/2000 | Ford | 320/128 |
| 6,215,276 B1 | * | 4/2001 | Smith | 320/111 |
| 6,291,965 B1 | * | 9/2001 | Nagai et al. | 320/106 |
| 6,314,303 B1 | * | 11/2001 | Phipps | 455/555 |
| 6,507,729 B1 | * | 1/2003 | Cheng | 455/90.1 |

FOREIGN PATENT DOCUMENTS

| | | |
|---|---|---|
| JP | 10-98512 | 4/1998 |
| JP | 2001-069205 | 3/2001 |
| JP | 2001-285417 | 10/2001 |

* cited by examiner

*Primary Examiner*—Duc M. Nguyen
(74) *Attorney, Agent, or Firm*—Nixon & Vanderhye P.C.

(57) ABSTRACT

When a portable communication terminal is being charged by a charger, a control signal according to a command entered into the charger is fed from the charger to the portable communication terminal so that, according to this control signal, the portable communication terminal reads out data from a recording medium. Meanwhile, of the data thus read out, data representing additional information (information such as the duration and title of a piece of music that is added to substantial information) is fed from the portable communication terminal to the charger, and this makes it possible to output the additional information, as by displaying it, on the part of the charger. Thus, the user can read out data from the recording medium by using the portable communication terminal in the middle of being charged without feeling awkward, and in addition can recognize the additional information easily even when the portable communication terminal is being charged.

10 Claims, 2 Drawing Sheets

PORTABLE COMMUNICATION TERMINAL CHARGER SYSTEM

BACKGROUND OF THE INVENTION

1. Field of the Invention

The present invention relates to a portable communication terminal charger system composed of a portable communication terminal having a function of reading out data stored on a recording medium and a charger for charging a power source incorporated in the portable communication terminal.

2. Description of the Prior Art

In recent years, portable communication terminals have been appearing on the market that have a function of recording music distributed from a communication carrier or sound reproduced from a music CD on a built-in or external recording medium and reproducing such sound from the recording medium.

With this type of portable communication terminal, when a sound signal recorded on the recording medium is read out to reproduce sound, the reproduction of the sound is achieved through a loudspeaker incorporated therein, or through headphones connected to a headphones terminal provided therein, or through audio equipment connected to the headphones terminal by way of a cable.

However, in a conventional portable communication terminal charger system, to reproduce sound recorded on the recording medium by the use of the portable communication terminal in the middle of being charged, the portable communication terminal needs to be operated directly, which makes the user feel awkward.

Moreover, on the recording medium is often stored, in addition to the substance of the stored data, also additional data associated therewith. For example, together with music data itself as the substance of the stored data, additional data such as the duration and title of a piece of music is stored as well. Accordingly, some portable communication terminals on the market have a function of displaying the additional data associated with the substance of the data currently being reproduced from the recording medium.

However, in a conventional portable communication terminal charger system, while the portable communication terminal is connected to a charger and is thus being charged the additional data displayed thereon is difficult to view.

Moreover, in a conventional portable communication terminal charger system, it is not possible to share a single charger among a plurality of models of portable communication terminals with different charging voltage and current requirements.

SUMMARY OF THE INVENTION

An object of the present invention is to provide a portable communication terminal charger system that permits data stored on a recording medium to be read out by the use of a portable communication terminal in the middle of being charged just as by the use of audio equipment without making the user feel awkward and that permits easy recognition of additional data read out from the recording medium by the use of the portable communication terminal in the middle of being charged.

An object of the present invention is to provide a portable communication terminal charger system that permits data stored on a recording medium to be read out by the use of a portable communication terminal in the middle of being charged just as by the use of audio equipment without making the user feel awkward and that permits a single charger to be shared among a plurality of models of portable communication terminals with different charging voltage and current requirements.

To achieve the above objects, according to one aspect of the present invention, in a portable communication terminal charger system provided with a portable communication terminal having a function of reading out data stored on a recording medium and a charger for charging a power source incorporated in the portable communication terminal, the portable communication terminal is provided with a control signal input portion for receiving a control signal from outside, a controller portion for controlling according to the control signal received by the control signal input portion the function of reading out data from the recording medium, and an additional data output portion for extracting from the data read out from the recording medium, which includes substantial data representing substantial information and additional data representing additional information added thereto, the additional data and outputting the extracted additional data to outside. Moreover, the charger is provided with a control signal output portion for outputting according to a command entered by a user a control signal to outside and an additional data input portion for receiving the additional data output from the portable communication terminal by the additional data output portion. Here, when the portable communication terminal is connected to the charger and is thereby brought into a state in which the portable communication terminal is ready to be charged by the charger, the control signal output from the charger by the control signal output portion thereof becomes ready to be input to the portable communication terminal by the control signal input portion thereof, and the additional data output from the portable communication terminal by the additional data output portion thereof becomes ready to be input to the charger by the additional data input portion thereof.

With this configuration, to read out data from the recording medium by using the portable communication terminal in the middle of being charged, it is necessary simply to enter a command into the charger, and therefore it is not necessary to operate the portable communication terminal directly. Thus, the user can read out data from the recording medium by using the portable communication terminal in the middle of being charged just as by using audio equipment or the like without feeling awkward.

To realize this operation environment, the user has only to connect the portable communication terminal to the charger to charge it, which is a procedure indispensable to a user of a portable communication terminal and is therefore not a kind of procedure felt by the user as complicated.

In addition, of the data read out from the recording medium by the use of the portable communication terminal in the middle of being charged, data representing additional information (information such as the duration and title of a piece of music that is added to substantial information) is fed from the portable communication terminal to the charger. This makes it possible to output the additional data, as by displaying it, on the part of the charger. Thus, the user can easily recognize the additional information read out from the recording medium by the use of the portable communication terminal in the middle of being charged.

A remote control unit may be additionally provided that permits the user to enter a command into the charger from a remote place. In this case, data representing additional information read out from the recording medium by the use of the portable communication terminal in the middle of being charged may be fed through the charger to the remote control unit. This makes it possible to output the additional information, as by displaying it, on the part of the remote control unit. Thus, the user can more easily recognize the additional information read out from the recording medium by the use of the portable communication terminal in the middle of being charged.

According to another aspect of the present invention, in a portable communication terminal charger system provided with a portable communication terminal having a function of reading out data stored on a recording medium and a charger for charging a power source incorporated in the portable communication terminal, the portable communication terminal is provided with a control signal input portion for receiving a control signal from outside and a controller portion for controlling according to the control signal received by the control signal input portion the function of reading out data from the recording medium. Moreover, the charger is provided with a control signal output portion for outputting according to a command entered by a user a control signal to outside, and is so configured that the charge voltage and the charge current fed to the portable communication terminal are adjustable. Here, when the portable communication terminal is connected to the charger and is thereby brought into a state in which the portable communication terminal is ready to be charged by the charger, the control signal output from the charger by the control signal output portion thereof becomes ready to be input to the portable communication terminal by the control signal input portion thereof.

With this configuration, to read out data from the recording medium by using the portable communication terminal in the middle of being charged, it is necessary simply to enter a command into the charger, and therefore it is not necessary to operate the portable communication terminal directly. Thus, the user can read out data from the recording medium by using the portable communication terminal in the middle of being charged just as by using audio equipment or the like without feeling awkward.

To realize this operation environment, the user has only to connect the portable communication terminal to the charger to charge it, which is a procedure indispensable to a user of a portable communication terminal and is therefore not a kind of procedure felt by the user as complicated.

In addition, the charger can adjust the charge voltage and the charge current fed to the portable communication terminal. This makes it possible to share a single charger among a plurality of models of portable communication terminals with different charge voltage and current requirements.

The charger may be so configured as to set the charge voltage and the charge current fed to the portable communication terminal according to a command entered by the user. Alternatively, the portable communication terminal may be so configured as to feed the charger with charge information representing the charge voltage and the charge current so that the charger sets the charge voltage and the charge current fed to the portable communication terminal according to the charge information fed from the portable communication terminal.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1:
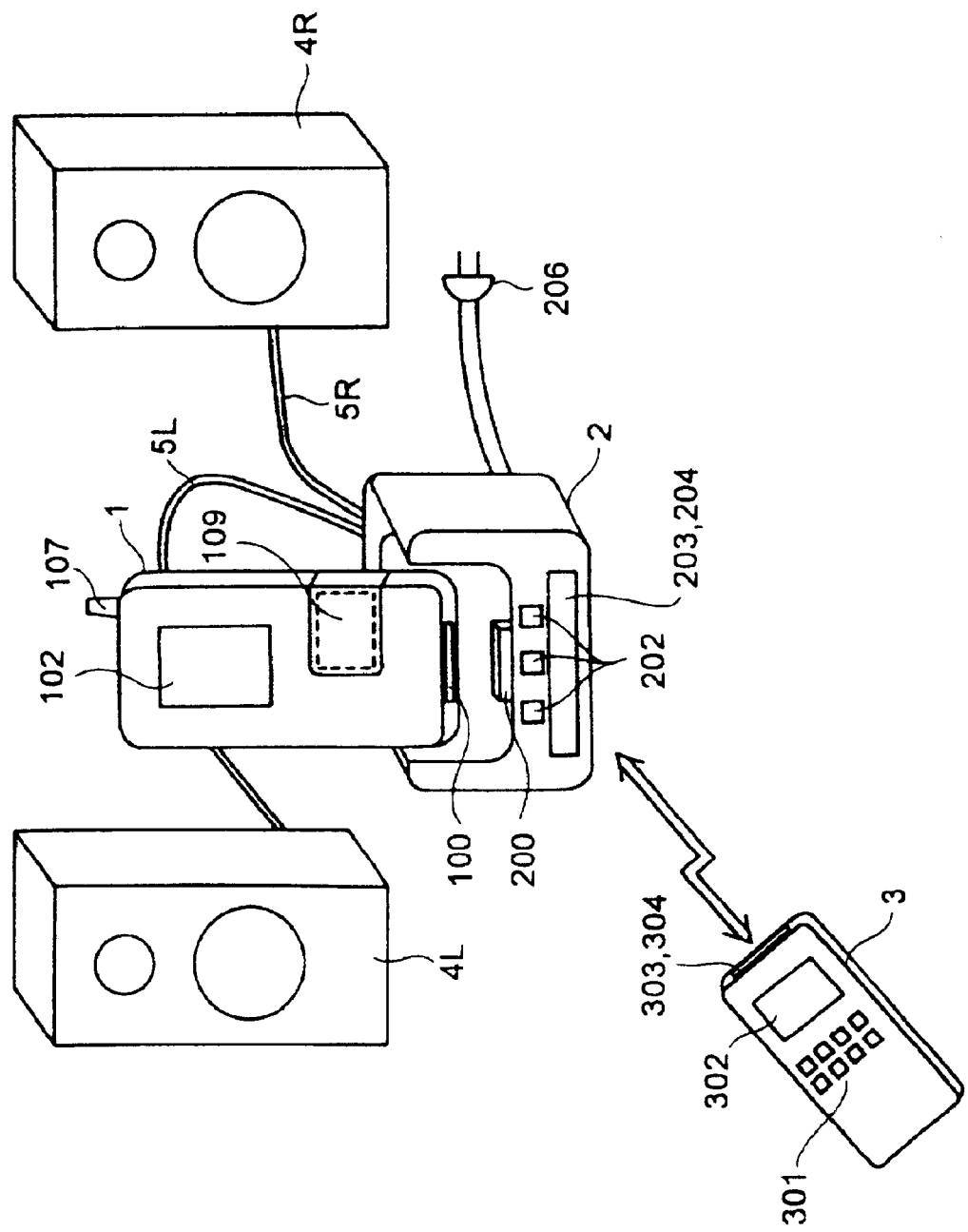
FIG. 1 is an external view of a portable communication terminal charger system embodying the invention.
Figure 2:
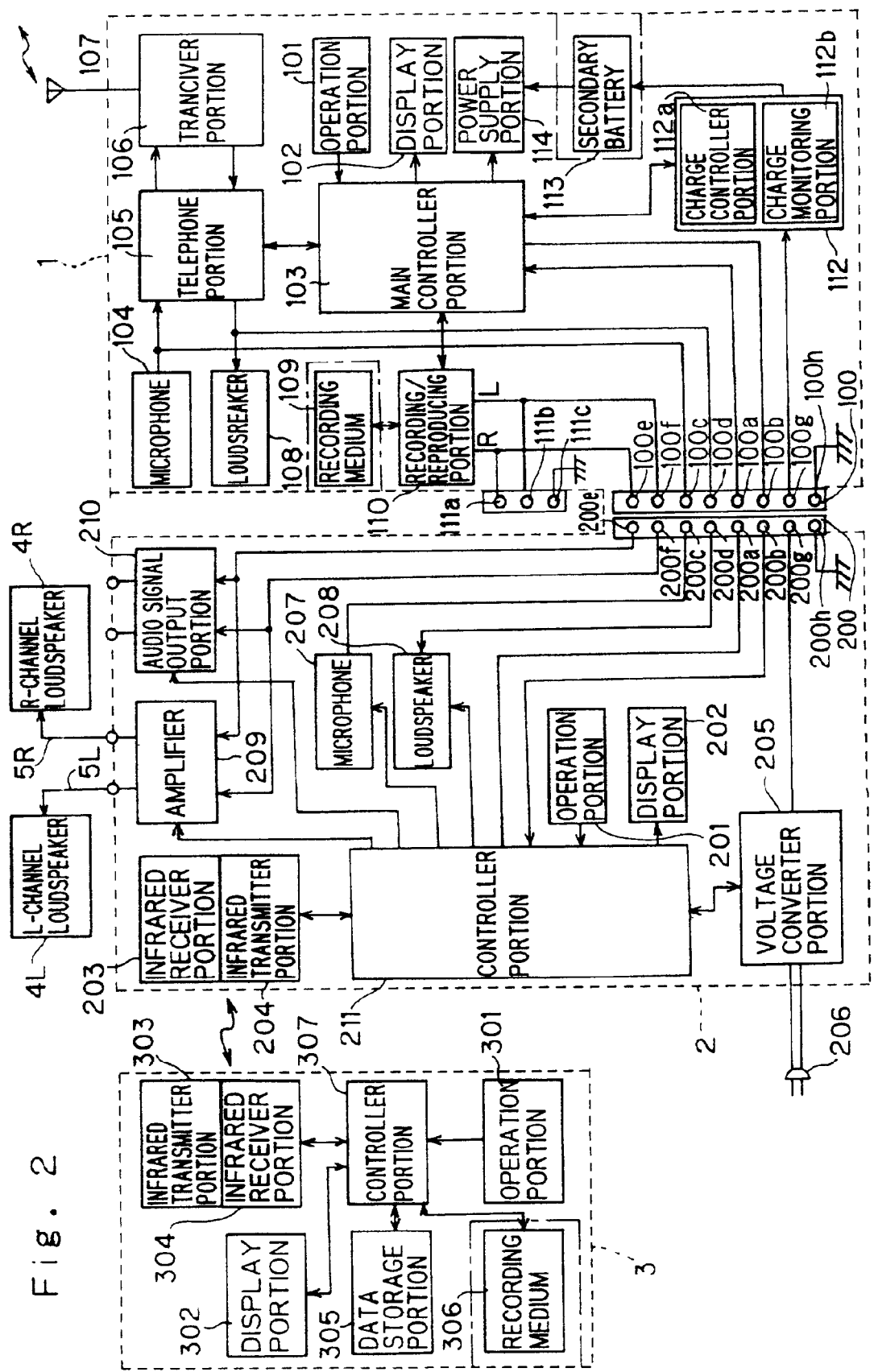
FIG. 2 is a block diagram of the portable communication terminal charger system embodying the invention.

Hereinafter, an embodiment of the present invention will be described with reference to the drawings. FIGS. 1 and 2 are an external view and a block diagram, respectively, of a portable communication terminal charger system embodying the invention. First, a portable communication terminal 1 will be described. The portable communication terminal 1 includes an operation portion 101, a display portion 102, a main controller portion 103, a microphone 104, a telephone portion 105, a transceiver portion 106, an antenna 107, a loudspeaker 108, a recording medium 109, a recording/reproducing portion 110, a charger portion 112, a secondary battery 113, and a power supply portion 114.

The operation portion 101 permits the user to enter various commands into the portable communication terminal 1. The display portion 102 displays various kinds of information. The main controller portion 103 controls the operation of the various blocks provided inside the portable communication terminal 1 according to input signals from the operation portion 101. Moreover, the main controller portion 103 exchanges various kinds of information with a controller portion 211 of a charger 2 that is connected thereto via terminals 100a and 100b of a connector 100 provided on the part of the portable communication terminal 1 and terminals 200a and 200b of a connector 200 provided on the part of the charger 2. Thus, the main controller portion 103 controls the operation of the various blocks inside the portable communication terminal 1 according to control information from the controller portion 211 of the charger 2 as well.

The microphone 104 converts sound fed in from outside into an electric signal. The telephone portion 105 encodes, by a predetermined method, the audio signal obtained from the microphone 104 and an audio signal fed in from outside via a terminal 100c of the connector 100.

The transceiver portion 106 modulates the audio signal encoded by the telephone portion 105, and transmits it via the antenna 107. Moreover, the transceiver portion 106 demodulates an audio signal from a signal received via the antenna 107. The audio signal is then decoded by the telephone portion 105, and is then converted into sound by the loudspeaker 108 so as to be output to outside. The decoded audio signal is also output to outside via a terminal 100d of the connector 100.

The recording medium 109 is removable from the portable communication terminal 1, and is used mainly for the storage of sound data. The recording medium 109 may be unremovable from the portable communication terminal 1. The recording/reproducing portion 110 reads out sound data from the recording medium 109 and decodes it. Moreover, the recording/reproducing portion 110 stores sound data fed from the main controller portion 103 on the recording medium 109.

The sound data read out by the recording/reproducing portion 110 is decoded into R (right)-channel and L (left)-channel audio signals, which are respectively output to outside via headphones terminals 111a and 111b, and also via terminals 100e and 100f of the connector 100. Furthermore, the recording/reproducing portion 110 extracts, from the data read out from the recording medium 109, additional data representing information (such as the duration and title of a piece of music) added to the substantial portion of the information stored, and feeds the extracted additional data to the main controller portion 103.

The charger portion 112 is composed of a charge controller portion 112a and a charge monitoring portion 112b. The charge controller portion 112a charges the secondary battery 113 by using electric power fed thereto from the charger 2 via a terminal 100g of the connector 100 of the portable communication terminal 1 and a terminal 200g of the connector 200 of the charger 2.

The charge monitoring portion 112b monitors the charge voltage fed to the secondary battery 113, and feeds the monitored information to the main controller portion 103. On the basis of the information from the charge monitoring portion 112b, the main controller portion 103 controls the charge controller portion 112a to charge or not to charge the secondary battery 113. The power supply portion 114 feeds adequate electric power to the various blocks inside the portable communication terminal 1. The secondary battery 113 is removable from the portable communication terminal 1.

Next, the charger 2 will be described. The charger 2 includes an operation portion 201, a display portion 202, an infrared receiver portion 203, an infrared transmitter portion 204, a voltage converter portion 205, a power plug 206, a microphone 207, a loudspeaker 208, an amplifier 209, an audio signal output portion 210, and a controller portion 211.

The operation portion 201 permits the user to enter various commands into the charger 2. The display portion 202 displays various kinds of information. The infrared receiver portion 203 receives signals transmitted by the use of infrared rays from a remote control unit 3. The infrared transmitter portion 204 transmits signals by the use of infrared rays to the remote control unit 3.

The voltage converter portion 205 converts the alternating-current power obtained from the power plug 206 plugged into a power outlet (not shown) into adequate direct-current power so as to feed electric power to the various blocks provided inside the charger 2. Moreover, the voltage converter portion 205 also feeds electric power with which to charge the secondary battery 113 to the portable communication terminal 1 connected thereto via the terminal 200g of the connector 200 of the charger 2 and the terminal 100g of the connector 100 of the portable communication terminal 1.

The microphone 207 converts sound fed in from outside into an electric signal. The audio signal obtained from the microphone 207 is output to outside via a terminal 200c of the connector 200. The loudspeaker 208 converts the audio signal fed in from outside via a terminal 200d of the connector 200 into sound, and outputs it to outside.

Instead of incorporating the loudspeaker 208, a block may be provided that outputs the audio signal fed in from outside via the terminal 200d of the connector 200 to a loudspeaker (not shown) that is externally connected to the charger 2.

The amplifier 209 amplifies R- and L-channel audio signals fed in respectively via terminals 200e and 200f of the connector 200. The R- and L-channel audio signals amplified by the amplifier 209 are converted into sound by an R-channel loudspeaker 4R and an L-channel loudspeaker 4L connected to the charger 2. The loudspeakers 4R and 4L may be incorporated in the charger 2.

The audio signal output portion 210 outputs the R- and L-channel audio signals fed in respectively via the terminals 200e and 200f of the connector 200 to audio equipment (not shown) connected to the charger 2.

The controller portion 211 controls the various blocks inside the charger 2 according to signals entered from the operation portion 201 by the user and signals received by the infrared receiver portion 203. Moreover, the controller portion 211 exchanges various kinds of information with the main controller portion 103 of the portable communication terminal 1 that is connected thereto via the terminals 200a and 200b of the connector 200 of the charger 2 and the terminals 100a and 100b of the connector 100 of the portable communication terminal 1. Thus, the controller portion 211 controls the various blocks inside the charger 2 according to information from the main controller portion 103 of the portable communication terminal 1 as well.

Next, the remote control unit 3 will be described. The remote control unit 3 includes an operation portion 301, a display portion 302, an infrared transmitter portion 303, an infrared receiver portion 304, a data storage portion 305, a recording medium 306, and a controller portion 307.

The operation portion 301 permits the user to enter various commands into the remote control unit 3. The display portion 302 displays various kinds of information. The infrared transmitter portion 303 transmits signals by the use of infrared rays to the charger 2. The infrared receiver portion 304 receives signals transmitted by the use of infrared rays from the charger 2.

The data storage portion 305 is a recording medium unremovable from the remote control unit 3. The recording medium 306 is removable from the remote control unit 3, and is used for the storage of sound data. The controller portion 307 controls the various blocks provided inside the remote control unit 3 according to signals entered from the operation portion 301 by the user and signals received by the infrared receiver portion 304.

In this embodiment, when the portable communication terminal 1 is properly mounted on the charger 2, the terminals 100a, 100b, 100c, 100d, 100e, 100f, 100g, and 100h of the connector 100 of the portable communication terminal 1 are respectively brought into direct contact with and thereby electrically connected to the terminals 200a, 200b, 200c, 200d, 200e, 200f, 200g, and 200h of the connector 200 of the charger 2. Thus, the secondary battery 113 of the portable communication terminal 1 becomes ready to be charged by the charger 2, and the portable communication terminal 1 becomes ready to exchange various kinds of information with the charger 2.

Here, the terminals of the connectors are electrically connected together by being brought into direct contact with each other. However, it is also possible to connect the connector 100 of the portable communication terminal 1 and the connector 200 of the charger 2 by way of a cable so that the terminals 100a, 100b, 100c, 100d, 100e, 100f, 100g, and 100h of the connector 100 of the portable communication terminal 1 are electrically connected respectively to the terminals 200a, 200b, 200c, 200d, 200e, 200f, 200g, and 200h of the connector 200 of the charger 2.

Now, what happens when a command is entered from the operation portion 301 of the remote control unit 3 to request the reproduction of sound data stored in the recording medium 109 of the portable communication terminal 1 will be described. Here, it is assumed that the portable communication terminal 1 is properly mounted on the charger 2 and the terminals of the connector 100 of the portable communication terminal 1 are electrically connected respectively to the terminals of the connector 200 of the charger 2.

The controller portion 307 of the remote control unit 3 makes the infrared transmitter portion 303 transmit a playback command. The playback command transmitted from the infrared transmitter portion 303 of the remote control unit 3 is received by the infrared receiver portion 203 of the charger 2, and is then transferred through the controller portion 211 of the charger 2 to the main controller portion 103 of the portable communication terminal 1.

In this embodiment, the main controller portion 103 of the portable communication terminal 1 and the controller portion 211 of the charger 2 exchange various kinds of information with each other by using serial signals that flow between them in one direction via the terminal 100a of the connector 100 and the terminal 200a of the connector 200 and in the opposite direction via the terminal 100b of the connector 100 and the terminal 200b of the connector 200. However, it is also possible to use parallel signals such as those transferred via an address data bus.

On receiving the playback command, the main controller portion 103 of the portable communication terminal 1 makes the recording/reproducing portion 110 read out sound data from the recording medium 109. The R- and L-channel audio signals read out by the recording/reproducing portion 110 are output to the outside respectively via the headphones terminals 111a and 111b, and simultaneously fed, via the terminals 100e and 100f of the connector 100 and the terminals 200e and 200f of the connector 200 respectively, to the charger 2. The R- and L-channel audio signals fed to the charger 2 are amplified by the amplifier 209 thereof, and are then reproduced as sound by the R- and L-channel loudspeakers 4R and 4L connected to the charger 2 by way of cables 5R and 5L, or by audio equipment (not shown) connected to the charger 2 through the audio signal output portion 210.

The additional data extracted by the recording/reproducing portion 110 from the data read out from the recording medium 109 is fed through the main controller portion 103 to the controller portion 211 of the charger 2. The controller portion 211 of the charger 2 makes the display portion 202 display the information represented by the additional data fed from the main controller portion 103 of the portable communication terminal 1, and simultaneously makes the infrared transmitter portion 204 transmit the additional data.

The additional data transmitted from the infrared transmitter portion 204 of the charger 2 is received by the infrared receiver portion 304 of the remote control unit 3 and is fed to the controller portion 307 of the remote control unit 3. The controller portion 307 of the remote control unit 3 makes the display portion 302 display the information represented by the additional data. What happens when a playback command is fed from the operation portion 201 of the charger 2 to request the reproduction of sound data stored in the recording medium 109 of the portable communication terminal 1 is the same as described above.

As described above, in this embodiment, to reproduce sound recorded on the recording medium 109 by the use of the portable communication terminal 1 in the middle of being charged, it is necessary only to operate the charger 2 or the remote control unit 3, that is, it is not necessary to operate the portable communication terminal 1 directly. This permits the user to reproduce sound from the recording medium 109 by using the portable communication terminal 1 in the middle of being charged just as by using audio equipment without feeling awkward. Needless to say, sound recorded on the recording medium 109 can be reproduced by the use of the portable communication terminal 1 in the middle of being charged also by operating the portable communication terminal 1 directly.

Moreover, to realize this operation environment, the user has only to connect the portable communication terminal to the charger to charge it, which is a procedure indispensable to a user of a portable communication terminal and is therefore not a kind of procedure felt by the user as complicated.

The infrared receiver portion for receiving signals transmitted from the remote control unit 3 may be provided on the part of the portable communication terminal 1 so that a command entered into the remote control unit 3 by the user is fed directly to the portable communication terminal 1. However, considering that, when the portable communication terminal 1 is carried around, it does not need to be operated from a remote place and that the portable communication terminal 1 needs to be as compact as possible, it is preferable, as in this embodiment, to provide the infrared receiver portion for receiving signals transmitted from the remote control unit 3 on the part of the charger 2 so that a command entered into the remote control unit 3 by the user is fed through the charger 2 to the portable communication terminal 1.

Moreover, simply by connecting the portable communication terminal 1 to the charger 2 to charge it, i.e. by performing a procedure indispensable to a user of a portable communication terminal, it is possible to reproduce high-quality sound by the use of an amplifier and loudspeakers that cannot be incorporated in the portable communication terminal 1 for lack of space. Moreover, the additional information (such as the duration and title of a piece of music) is displayed on the charger 2 or the remote control unit 3. This permits the user to recognize the additional information easily even when the portable communication terminal 1 is in the middle of being charged, and is thus very convenient to the user.

Next, what happens when a recording command is entered from the operation portion 301 of the remote control unit 3 to request the recording of sound data on the recording medium 109 of the portable communication terminal 1 will be described. Here, it is assumed that the portable communication terminal 1 is properly mounted on the charger 2 and the terminals of the connector 100 of the portable communication terminal 1 are electrically connected respectively to the terminals of the connector 200 of the charger 2.

The controller portion 307 of the remote control unit 3 reads out, from the recording medium 306, sound data to be recorded. Here, the sound data thus read out may be stored and held in the data storage portion 305. Next, the controller portion 307 of the remote control unit 3 makes the infrared transmitter portion 303 transmit the recording command and the sound data read out.

The recording command and the sound data transmitted from the infrared transmitter portion 303 of the remote control unit 3 are received by the infrared receiver portion 203 of the charger 2, and are transferred through the controller portion 211 of the charger 2 to the main controller portion 103 of the portable communication terminal 1. The main controller portion 103 of the portable communication terminal 1 makes the recording/reproducing portion 110 store the sound data transmitted together with the recording command on the recording medium 109.

In this way, in this embodiment, to store sound data on the recording medium 109 by the use of the portable communication terminal 1 connected to the charger 2, it is necessary simply to read out the sound data from the recording medium 306 and transmit it to the charger 2 by the use of the remote control unit 3. This does not require connection using a cable or the like, and is therefore convenient. The system may be so configured that the recording medium 109 and the recording medium 306 can transmit and receive their respective data to and from each other with the help of the portable communication terminal 1, the charger 2, and the remote control unit 3 so that data can be moved and copied between the recording medium 109 and the recording medium 306.

In this embodiment, sound data to be stored on the recording medium 109 is transmitted to the charger 2 by the use of infrared rays. However, such sound data may be transmitted by the use of radio waves, or on a wired basis (by the use of a cable).

Moreover, in this embodiment, as long as the portable communication terminal 1 is in a state ready to be charged by the charger 2, the terminals 100c and 100d of the connector 100 of the portable communication terminal 1 are electrically connected respectively to the terminals 200c and 200d of the connector 200 of the charger 2. Thus, by using the microphone 207 and the loudspeaker 208 of the charger 2, it is possible to make a call with the portable communication terminal 1 mounted on the charger 2. This is convenient.

In a case where the portable communication terminal 1 has the capability of connecting to the Internet, by configuring the system in such a way that the main controller portion 103 of the portable communication terminal 1 controls connection to the Internet according to control signals from the controller portion 211 of the charger 2, it is possible, by operating the charger 2 or the remote control unit 3, to try out or download a piece of music from the contents on the Internet or perform other operation by the use of the portable communication terminal 1 connected to the charger 2. This is convenient.

In the embodiment described above, signals are transferred between the remote control unit 3 and the charger 2 by the use of infrared rays. However, these signals may be transferred by the use of radio waves, or on a wired basis (by the use of a cable).

In the embodiment described above, data is exchanged between the portable communication terminal 1 and the charger 2 via the dedicated terminals 100a, 10b, 200a, and 200b. However, it is also possible to exchange data in a form superimposed on the supply of electric power for charging the portable communication terminal 1, i.e. to use the terminals 100g and 200g for charging also as terminals for the exchange of various kinds of data between the portable communication terminal 1 and the charger 2. This helps reduce the number of terminals. The exchange of data between the portable communication terminal 1 and the charger 2 may be achieved by the use of infrared rays or radio waves.

The system may be so configured that the main controller portion 103 of the portable communication terminal 1 feeds information indicating the operation status of the portable communication terminal 1 (such as reading out data from the recording medium 109 and writing data to the recording medium 109) to the controller portion 211 of the charger 2 so that the controller portion 211 of the charger 2 makes the display portion 202 of the charger 2 display the operation status of the portable communication terminal 1. This permits the user to recognize the operation status of the portable communication terminal 1 easily, and thus enhances user-friendliness.

The system may be so configured that the controller portion 211 of the charger 2 makes the infrared transmitter portion 204 transmit the information indicating the operation status of the portable communication terminal 1 to the remote control unit 3 so that the controller portion 307 of the remote control unit 3 make the display portion 302 display the information indicating the operation status of the portable communication terminal 1 that is received by the infrared receiver portion 304. This permits the user to recognize the operation status of the portable communication terminal 1 more easily, and thus further enhances user-friendliness.

It is preferable that a multiple-function charger like the charger 2 of this embodiment be shared among a plurality of models of portable communication terminals 1. To achieve this, since different models of portable communication terminals incorporate different types of secondary battery 113, the charger 2 will very likely need to adjust the charge voltage and the charge current according to the model of the portable communication terminal 1 connected thereto.

To cope with this, the system may be so configured that the main controller portion 103 of the portable communication terminal 1 feeds information indicating the model (more specifically, information indicating the charge voltage and the charge current required) to the controller portion 211 of the charger 2 and that, on the basis of this information, the controller portion 211 of the charger 2 adjusts the charge voltage and the charge current output from the voltage converter portion 205 to the portable communication terminal 1 to charge the secondary battery 113 thereof.

Instead of making the portable communication terminal 1 and the charger 2 adjust the charge voltage and the charge current automatically, it is also possible to permit the user to set the charge voltage and the charge current manually on the charger 2 or the remote control unit 3.

The embodiment described above deals with a case where sound data is stored on the recording medium 109. However, this data may be of any other kind, for example image data of still or moving pictures. For example, in a case where image data is stored on the recording medium 109, the charger 2 is provided with at least one of an image data output portion for outputting the image data read out from the recording medium 109 in the portable communication terminal 1 and then transferred thereto to outside and a data reproducing portion (the display portion 202 may be shared) for reproducing the image data by displaying it.

This permits the user to reproduce images from the recording medium 109 without awkward operation. Moreover, by reproducing the image data read out from the recording medium 109 in the portable communication terminal 1 on the charger 2 or on a display device externally connected to the charger 2, it is possible to enjoy high-quality images that cannot be displayed on the portable communication terminal 1 for lack of space.

What is claimed is:

1. A portable communication terminal charger system comprising
a portable communication terminal having a function of reading out data stored on a recording medium and a charger for charging a power source incorporated in the portable communication terminal,
wherein the portable communication terminal comprises a control signal input portion for receiving a control signal from outside, a controller portion for controlling according to the control signal received by the control signal input portion the function of reading out data from the recording medium, and an additional data output portion for extracting from the data read out from the recording medium, which includes substantial data representing substantial information and additional data representing additional information added thereto, the additional data and outputting the extracted additional data to outside, wherein the charger comprises a control signal output portion for outputting according to a command entered by a user a control signal to outside and an additional data input portion for receiving the additional data output from the portable communication terminal by the additional data output portion, and wherein, when the portable communication terminal is connected to the charger and is thereby brought into a state in which the portable communication terminal is ready to be charged by the charger, the control signal output from the charger by the control signal output portion thereof becomes ready to be input to the portable communication terminal by the control signal input portion thereof, and the additional data output from the portable communication terminal by the additional data output portion thereof becomes ready to be input to the charger by the additional data input portion thereof.

2. A portable communication terminal charger system as claimed in claim 1, wherein the charger further comprises a display portion for displaying the information represented by the additional data input thereto by the additional data input portion thereof.

3. A portable communication terminal charger system as claimed in claim 2, further comprising:

a remote control unit that permits the user to enter a command into the charger from a remote place, wherein the charger further comprises an additional data output portion for outputting the additional data input thereto by the additional data input portion thereof to the remote control unit, and wherein the remote control unit comprises an additional data input portion for receiving the additional data output from the charger by the additional data output portion thereof.

4. A portable communication terminal charger system as claimed in claim 3, wherein the remote control unit further comprises a display portion for displaying the information represented by the additional data input thereto by the additional data input portion thereof.

5. A portable communication terminal charger system of claim 1, wherein the charger comprises a control signal output portion for outputting according to a command entered by a user a control signal to outside, and is so configured that a charge voltage and a charge current fed to the portable communication terminal are adjustable, and wherein, when the portable communication terminal is connected to the charger and is thereby brought into a state in which the portable communication terminal is ready to be charged by the charger, the control signal output from the charger by the control signal output portion thereof becomes ready to be input to the portable communication terminal by the control signal input portion thereof.

6. A portable communication terminal charger system as claimed in claim 5, wherein the charger sets the charge voltage and the charge current fed to the portable communication terminal according to a command entered by a user.

7. A portable communication terminal charger system as claimed in claim 5, wherein the portable communication terminal is so configured as to feed the charger with charge information representing the charge voltage and the charge current, and the charger sets the charge voltage and the charge current fed to the portable communication terminal according to the charge information fed from the portable communication terminal.

8. The portable communication terminal charger system of claim 1, wherein the substantial information comprises sound and/or video data, and the extracted additional data comprises information indicative of the duration and/or title of music being read out from the recording medium.

9. The portable communication terminal charger system of claim 1, wherein the recording medium is located in the portable communication terminal.

10. The portable communication terminal charger system of claim 1, wherein the extracted additional data from the recording medium comprises information relating to music being read from the recording medium, and wherein the extracted additional data is displayed at the charger and/or at a remote control while music is being played during charging.

* * * * *